(12) United States Patent
Jochman

(10) Patent No.: US 12,176,792 B2
(45) Date of Patent: Dec. 24, 2024

(54) ENGINE-DRIVEN GENERATORS AND POWER SYSTEMS HAVING GENERATOR HOUSING ALIGNMENT AND LOCATING HARDWARE

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 28 days.

(21) Appl. No.: 17/708,881

(22) Filed: Mar. 30, 2022

(65) Prior Publication Data
US 2023/0318401 A1    Oct. 5, 2023

(51) Int. Cl.
| H02K 7/18 | (2006.01) |
|---|---|
| F02B 63/04 | (2006.01) |
| H02K 1/12 | (2006.01) |
| H02K 5/22 | (2006.01) |

(52) U.S. Cl.
CPC ......... *H02K 7/1815* (2013.01); *F02B 63/044* (2013.01); *H02K 1/12* (2013.01); *H02K 5/22* (2013.01); *F02B 2063/045* (2013.01)

(58) Field of Classification Search
CPC ........... H02K 7/1815; H02K 1/12; H02K 5/22
See application file for complete search history.

(56) References Cited

U.S. PATENT DOCUMENTS

| 4,883,997 A | * | 11/1989 | De Cesare | ............. | H02K 17/10 310/179 |
|---|---|---|---|---|---|
| 4,942,323 A | * | 7/1990 | DeCesare | ............. | H02K 1/146 310/216.025 |
| 5,248,911 A | * | 9/1993 | Joseph | ................... | H02K 5/15 310/216.127 |
| 5,458,100 A | * | 10/1995 | Neuenfeld | ............. | F02B 63/04 29/402.06 |
| 6,133,659 A | * | 10/2000 | Rao | ................... | B60L 15/2009 123/3 |

(Continued)

FOREIGN PATENT DOCUMENTS

| CN | 103580356 A | * | 2/2014 | ......... H02K 11/0094 |
|---|---|---|---|---|
| CN | 103580356 B | * | 6/2017 | ......... H02K 11/0094 |

(Continued)

*Primary Examiner* — Pedro J Cuevas
(74) *Attorney, Agent, or Firm* — McAndrews, Held & Malloy, Ltd.

(57) ABSTRACT

An example engine-driven generators includes: a stator assembly having first mounting holes; a first generator housing configured to couple the stator assembly to an engine, and having second mounting holes; first stator alignment hardware configured to align the first mounting holes of the stator assembly with corresponding ones of the second mounting holes of the first generator housing; stator securing hardware configured to secure the stator assembly in cooperation with the first stator alignment hardware; first locating faces configured to mate with mating faces of corresponding ones of the second mounting holes to locate the first mounting holes with the second mounting holes; and first housing securing hardware configured to secure the first generator housing to the stator assembly.

18 Claims, 8 Drawing Sheets

(56) References Cited

U.S. PATENT DOCUMENTS

| | | | | |
|---|---|---|---|---|
| 6,624,543 B1* | 9/2003 | Bankstahl | ............... | F02B 63/04 |
| | | | | 310/91 |
| 7,199,496 B2* | 4/2007 | Suzuki | ................... | H02K 11/33 |
| | | | | 310/68 R |
| 7,628,651 B2* | 12/2009 | Yeh | ...................... | H05K 7/1061 |
| | | | | 439/607.37 |
| 9,206,540 B2* | 12/2015 | Lim | ...................... | D06F 37/304 |
| 9,231,449 B2* | 1/2016 | Uryu | ...................... | H02K 11/33 |
| 10,359,579 B2* | 7/2019 | Fabian | ................ | G02B 6/3878 |
| 11,705,786 B1* | 7/2023 | Bonny | ................... | H02K 7/116 |
| | | | | 310/71 |
| 2006/0061224 A1* | 3/2006 | Mullin | ................... | H02K 11/33 |
| | | | | 310/91 |
| 2009/0104796 A1* | 4/2009 | Yeh | ...................... | H05K 7/1061 |
| | | | | 439/73 |
| 2012/0240637 A1* | 9/2012 | Lim | ...................... | D06F 37/304 |
| | | | | 68/140 |
| 2014/0035407 A1* | 2/2014 | Uryu | ...................... | H02K 7/116 |
| | | | | 310/71 |
| 2018/0299625 A1* | 10/2018 | Fabian | ................ | G02B 6/3885 |

FOREIGN PATENT DOCUMENTS

| | | | | | |
|---|---|---|---|---|---|
| CN | 107645218 | A | * | 1/2018 | ............... H02K 1/12 |
| EP | 1542340 | A2 | * | 6/2005 | ............. H02K 11/33 |
| EP | 3273575 | A1 | * | 1/2018 | ............... H02K 1/12 |
| JP | 2014033540 | A | * | 2/2014 | ......... H02K 11/0094 |

* cited by examiner

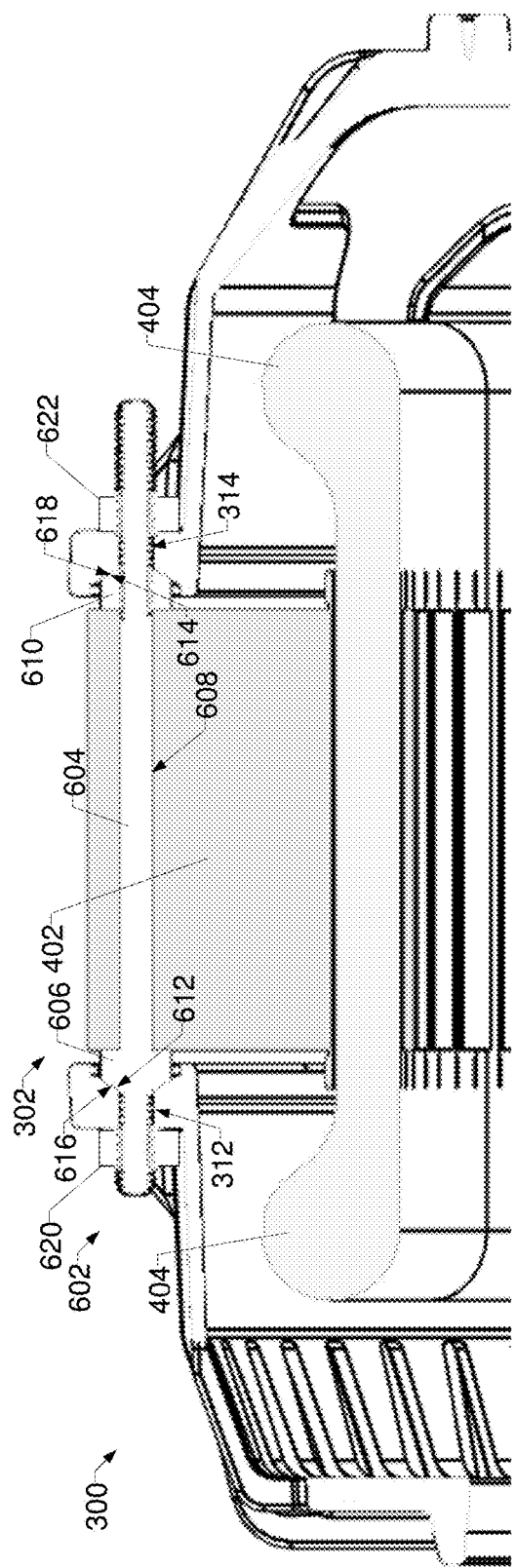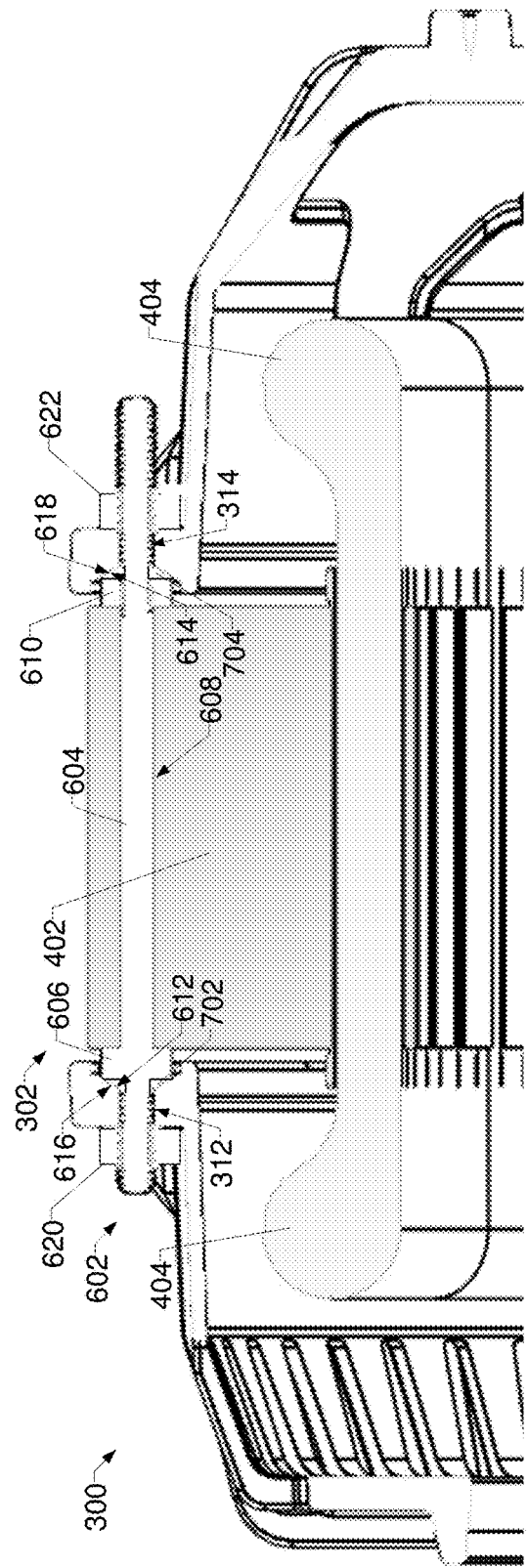

ENGINE-DRIVEN GENERATORS AND POWER SYSTEMS HAVING GENERATOR HOUSING ALIGNMENT AND LOCATING HARDWARE

FIELD OF THE DISCLOSURE

This disclosure relates generally to power systems and, more particularly, engine-driven generators and power systems having generator housing alignment and locating hardware.

BACKGROUND

Conventional engine-driven power systems include a generator assembly, which include a stator assembly and rotor assembly. The stator attaches to the enclosure or other stationary part of the conventional power system. The rotor assembly attaches and is driven via a rotating engine shaft as the engine shaft is the input power to the generator assembly.

SUMMARY

Engine-driven generators and power systems having generator housing alignment and locating hardware are disclosed, substantially as illustrated by and described in connection with at least one of the figures, as set forth more completely in the claims.

BRIEF DESCRIPTION OF THE DRAWINGS

FIG. 7A is a more detailed cross-sectional elevation view of an example of an assembly of the generator housings, stator assembly, and alignment, mounting, and locating hardware.

FIG. 7B is a detailed cross-sectional elevation view of an example of the assembly of the generator housings, the stator assembly, and another example implementation of the hardware assemblies including alignment, locating, and securing hardware.

The figures are not necessarily to scale. Where appropriate, similar or identical reference numbers are used to refer to similar or identical components.

DETAILED DESCRIPTION

Figure 1:
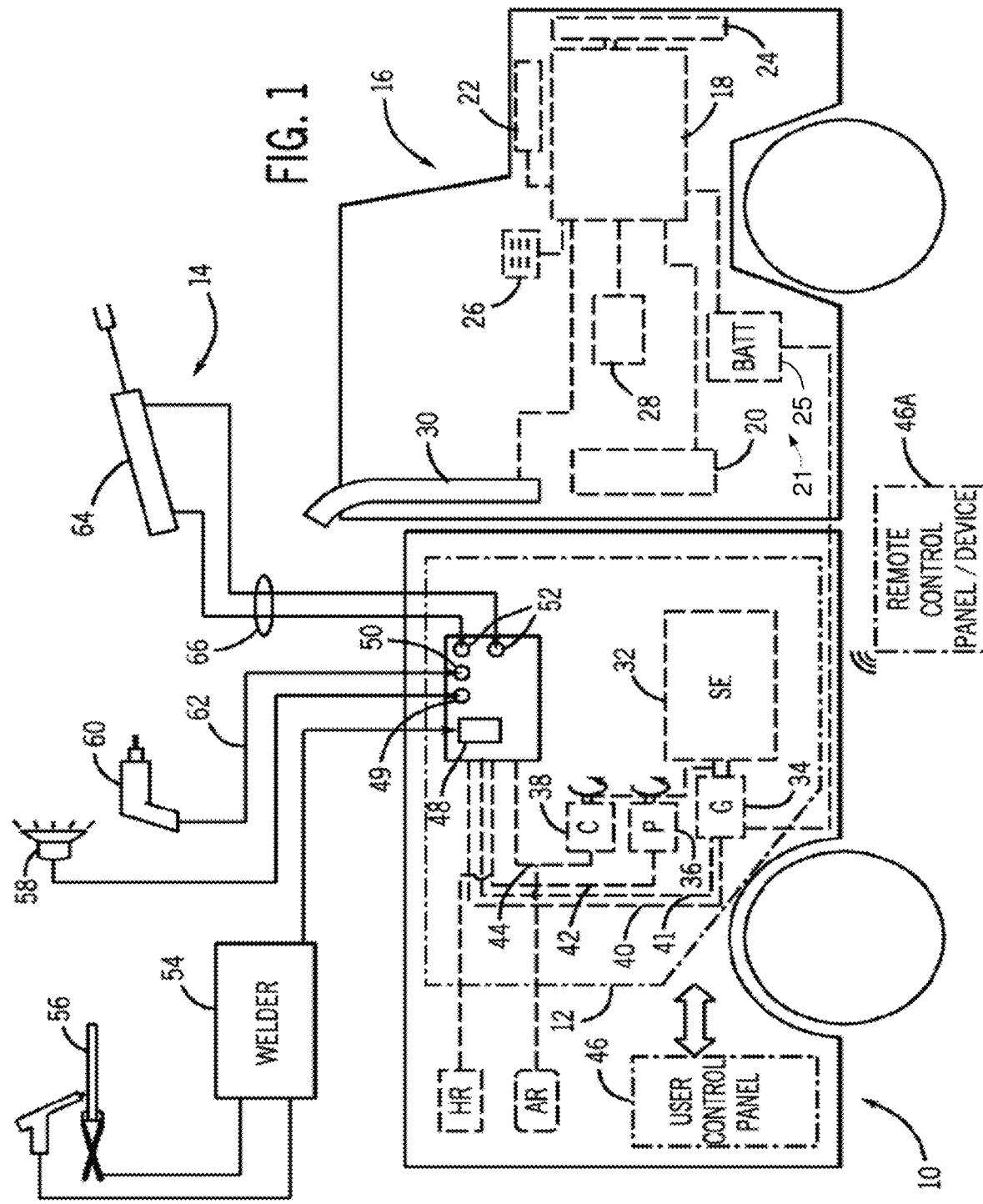
FIG. 1 is a diagrammatical overview of a work vehicle in which a service pack is installed, in accordance with aspects of the present disclosure.

Conventional engine-driven generators may include a stator assembly, a rotor assembly, and a housing constructed using one or more pieces. When assembling conventional engine-driven generators, care must be taken to achieve the desired alignment between the parts to provide as consistent of a stator-to-rotor gap length as can be achieved. The stator-to-rotor gap length may be dependent on the tolerances of machined parts and/or manual alignment of the parts. Furthermore, manufacturing variation in the stator-to-rotor gap length may require a smaller layer of varnish than may be desired for a particular application.

Disclosed example engine-driven generators and power systems provide a mechanical attachment system between a stator assembly and one or more housing components that allows a simpler, smaller, and easier attachment of the stator assembly to the housing components, and which provides for a more consistent stator-to-rotor gap length.

In some disclosed examples, a generator stator assembly is connected to a housing using stator stack bolting hardware having tapered or cone-shaped faces to locate and secure the stator to the adjacent housing in the desired alignment. Cone-shaped faces have the advantage of being easy to manufacture on a stud head and/or on a nut. Disclosed example engine-driven generators implement stator alignment, locating, and securing hardware such as a stud with a tapered face on one end of a stator assembly, and a nut with a tapered face on the opposing end of the stator assembly. The stud and nut are tightened together over a stator lamination stack to produce a clamped stator assembly. In some examples, the stud further has threads on both ends, which are used for mounting the stator assembly to the housings. The assembly of the stud and nut provides controlled tapered faces for attachment to the generator housing components.

In disclosed examples, the tapered locating and mating faces of the hardware and housings control the position because, as the assembly is tightened, the tapered faces draw together and in-line (e.g., concentric) to each other. The machined geometries are simple to produce, and provide accurate location and axial position of the stator nut and/or stud. This geometry is repeated multiple times around the stator to provide uniform attachment and connection.

Disclosed examples significantly simplify machining of the housings by eliminating multiple machining steps common with generator housings, and simplify manufacturing by providing simpler location of the housings and stator during attachment. Disclosed examples also allow for the stator to be varnished with relatively thick layers of varnish without requiring extensive secondary processing or labor-intensive control of the varnish process.

Disclosed examples may enable a smaller overall generator enclosure size for a given output and/or lower housing manufacturing costs due to simplified machining. In some examples, the hardware may be configured to be used in multiple stator lamination stack lengths, allowing for flexibility in configuration and reuse of the assembly hardware.

While disclosed examples are described with reference to example sets of hardware for stator alignment, securing the stator, locating the stator and housing(s), and/or securing the stator to the housing(s), other sets of hardware may be used to provide the alignment, location, and/or securing.

Welding-type power, as used herein, refers to power suitable for welding, plasma cutting, induction heating, electrode preheating, CAC-A and/or hot wire welding/preheating (including laser welding and laser cladding).

As used herein, the terms "power system," "service pack" and "auxiliary power unit" refer to an engine driven power source which may be auxiliary or supplemental to a primary power source such as a vehicle engine.

Disclosed example engine-driven generators include: a stator assembly having first mounting holes; a first generator housing configured to couple the stator assembly to an engine, and having second mounting holes; first stator alignment hardware configured to align the first mounting holes of the stator assembly with corresponding ones of the second mounting holes of the first generator housing; stator securing hardware configured to secure the stator assembly in cooperation with the first stator alignment hardware; first locating faces configured to mate with mating faces of corresponding ones of the second mounting holes to locate the first mounting holes with the second mounting holes; and first housing securing hardware configured to secure the first generator housing to the stator assembly.

Some example engine-driven generators further include: a second generator housing opposite the first generator housing and having third mounting holes; second locating faces configured to mate with mating faces of corresponding ones of the third mounting holes to locate the first mounting holes with the third mounting holes; and second housing securing hardware configured to secure the second generator housing to the stator assembly. In some example engine-driven generators, the second locating faces are faces on the stator securing hardware and are configured to align the first stator alignment hardware with the corresponding ones of the third mounting holes. In some example engine-driven generators, the second housing securing hardware includes a plurality of third nuts configured to secure the second generator housing to the stator assembly via the first stator alignment hardware. In some example engine-driven generators, the second generator housing includes a bearing configured to support a rotor assembly.

In some example engine-driven generators, the first locating faces are located on the first stator alignment hardware and are configured to align the first stator alignment hardware with the corresponding ones of the second mounting holes. In some example engine-driven generators, the first stator alignment hardware includes a plurality of studs, each of the studs having a head having a corresponding one of the first locating faces. In some example engine-driven generators, the stator securing hardware includes a plurality of first nuts configured to secure the stator assembly in cooperation with the plurality of studs. In some example engine-driven generators, the first housing securing hardware includes a plurality of second nuts configured to secure the first generator housing to the stator assembly via the plurality of studs. In some example engine-driven generators, the first locating faces of the plurality of studs include tapered faces, and the mating faces of the second mounting holes are configured to guide the first locating faces of the plurality of studs into alignment with the second mounting holes.

In some example engine-driven generators, the first stator alignment hardware includes a bolt and a separate nut having the mating face. Some example engine-driven generators further include an enclosure and the engine within the enclosure, in which the rotor assembly is driven by the engine and the engine-driven generator is within the enclosure. In some example engine-driven generators, the enclosure include a support structure, and the second generator housing includes mounting feet configured to secure the second generator housing to the support structure. In some example engine-driven generators, the stator assembly includes a stack of laminations, and the first stator alignment hardware and the stator securing hardware clamp the stack of laminations together.

Disclosed example methods to assemble an engine-driven generator, involve: installing a plurality of studs through corresponding first mounting holes in a stator assembly, and securing the stator assembly by securing a first plurality of nuts onto the plurality of studs; aligning first ends of the plurality of studs with second mounting holes in a first generator housing by aligning tapered faces of the plurality of studs with corresponding tapered faces of the second mounting holes; and securing the stator assembly to the first generator housing by securing a second plurality of nuts to the studs on opposite ends of the second mounting holes from the tapered faces of the plurality of studs.

Some example methods further involve: aligning second ends of the plurality of studs with third mounting holes in a second generator housing by aligning tapered faces of the first plurality of nuts with corresponding tapered faces of the third mounting holes; and securing the second generator housing to the stator assembly by securing a third plurality of nuts to the studs on opposite ends of the third mounting holes from the tapered faces of the first plurality of nuts.

Disclosed engine-driven generators include: a rotor assembly; a stator assembly having first mounting holes; a first generator housing configured to couple the rotor assembly and the stator assembly to an engine, and having second mounting holes; a second generator housing opposite the first generator housing and having third mounting holes; a plurality of studs configured to align the first mounting holes of the stator assembly with corresponding ones of the second mounting holes of the first generator housing and corresponding ones of the third mounting holes of the second generator housing, each of the studs comprising a head having a tapered face configured to mate with a tapered face of a corresponding one of the second mounting holes; a plurality of first nuts configured to secure the stator assembly in cooperation with the plurality of studs, each of the first nuts comprising a tapered face configured to mate with a tapered face with a corresponding one of the third mounting holes; a plurality of second nuts configured to secure the first generator housing to the stator assembly via the plurality of studs; and a plurality of third nuts configured to secure the second generator housing to the stator assembly via the plurality of studs.

Turning now to the drawings, and referring first to FIG. 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. The work vehicle 10 has a main vehicle power plant 16 based around a vehicle engine 18. Example work vehicle engines of this type may be diesel engines, gasoline engines, and/or mixed ethanol-gasoline engines.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain examples may use gasoline, diesel, natural gas, liquid petroleum gas, three-phase brush-type generators, and/or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw air compressor or a reciprocating compressor based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC and/or 24 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 120 VAC and/or 240 VAC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as gas metal arc welding (GMAW), shielded metal arc welding (SMAW), flux-cored arc welding (FCAW), gas tungsten arc welding (GTAW), and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. One or more of the services provided by the work vehicle 10 may be performed without the need to operate the main vehicle engine at a service site.

Figure 2:
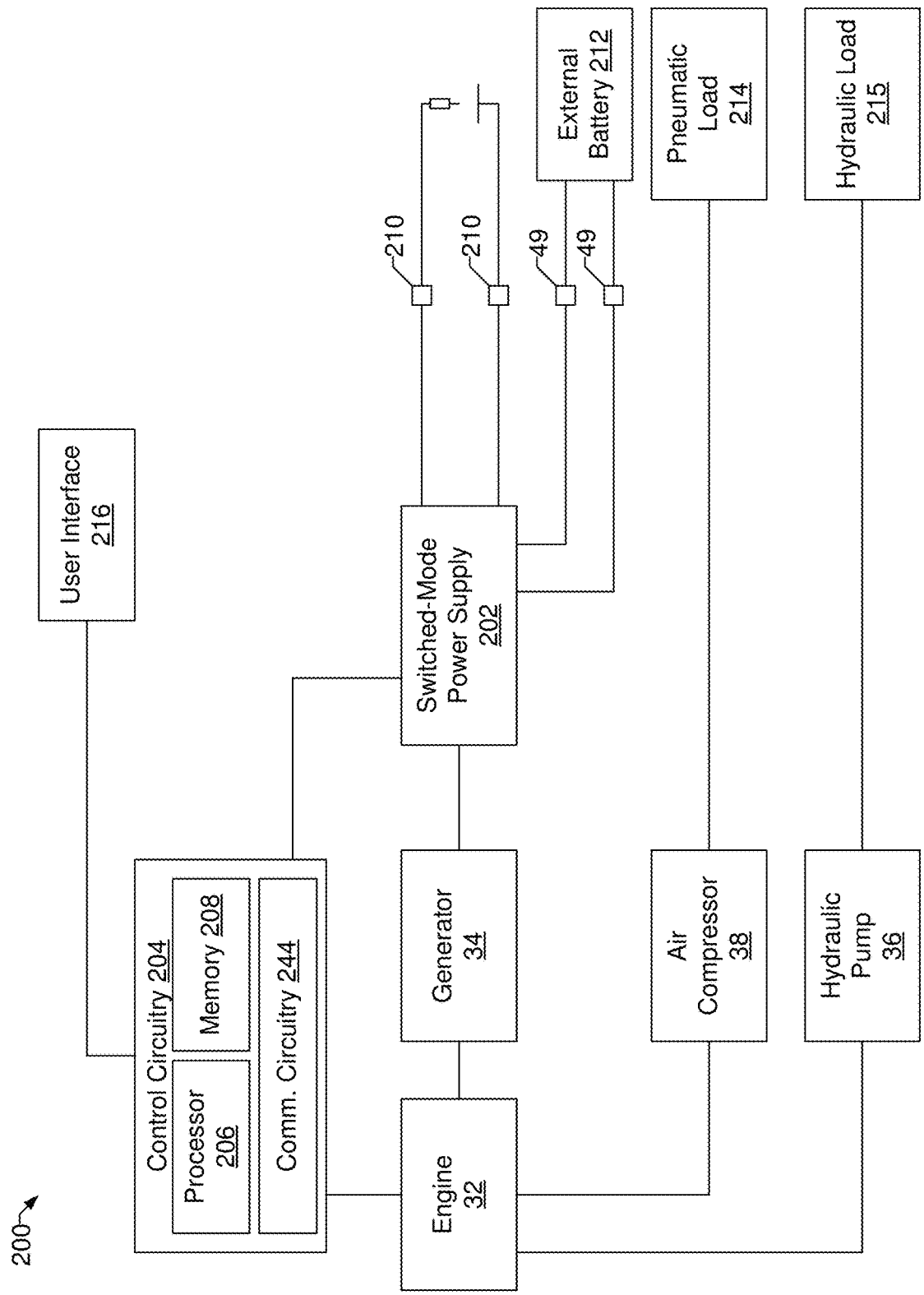
FIG. 2 is a block diagram of an example power system that may be used to implement the service pack of FIG. 1.

FIG. 2 is a block diagram of an example power system 200 that may be used to implement the service pack 12 of FIG. 1. The example power system 200 includes the service engine 32, the generator 34, the hydraulic pump 36, the air compressor 38, a switched-mode power supply 202, and the control circuitry 204.

The switched-mode power supply 202 converts the electrical power from the generator 34 to output power. Generally, the switched-mode power supply 202 includes a rectifier, a boost converter, an inverter, a transformer, an output stage, and/or any other circuitry. However, other configurations of the switched-mode power supply 202 may be used. The output power may include welding-type power, and/or non-welding AC and/or DC electrical power (e.g., DC battery charging power). In some examples, the generator 34 outputs AC power at a predetermined voltage (e.g., 120 VAC, 240 VAC) and a predetermined frequency (e.g., 50 Hz, 60 Hz, 400 Hz).

The control circuitry 204 includes one or more processor(s) 206 and a machine readable memory 208 or other storage device to store instructions for execution by the processor(s) 206. The example control circuitry 204 controls the output of the switched-mode power supply 202 based on the desired load or task. In some examples, the control circuitry 204 and/or a separate engine control unit (ECU) control the speed of the engine 32, which controls an input to the switched-mode power supply 202 (via the generator 34). For example, the control circuitry 204 may control switching elements of the boost converter and/or the inverter stages of the switched-mode power supply 202 to control voltage, current, frequency, and/or other characteristics of the output from the switched-mode power supply 202. The control circuitry 204 may control the switched-mode power supply 202 to provide voltage-controlled welding power, current-controlled welding power, battery-charging power, AC power for electrical tools, and/or any other type of welding-type and/or non-welding-type electrical power. For example, the switched-mode power supply 202 may output welding-type power via welding terminals 210, and/or non-welding power via the DC receptacle 49. For example, the switched-mode power supply 202 may output DC power to charge an external battery 212 via the DC receptacle 49.

The air compressor 38 provides air pressure to one or more pneumatic load(s) 214, such as pneumatically powered tools. The hydraulic pump 36 provides hydraulic power to one or more hydraulic load(s) 215.

The power system 200 includes a user interface 216, which includes an input device 218. The input device 218 is configured to receive inputs selecting mode(s) 222, 224 representative of welding-type processes, mode(s) 226, 228 representative of one or more battery charging modes, mode(s) 230 representative of a vehicle load, and/or other modes such as a pneumatic load 232, and/or a hydraulic load 234. The example user interface 216 further includes indicators 236, 238, 240, 242. The example input device 218 is a rotary encoder device, and provides a signal to the control circuitry 204 based on the selected mode 222-234.

The example user interface 216 may further include controls configured to modify welding and/or battery charging parameters, such as a welding voltage setpoint, a welding wire feed speed setpoint, a welding current setpoint, a nominal battery output voltage, a workpiece material thickness, welding wire parameters (e.g., thickness, type, etc.), a DC output current limit, and/or any other parameters. In some examples, the control circuitry 204 automatically determines one or more welding and/or battery charging parameters based on the input device 218 and additional controls, such as by determining a welding voltage and wire feed speed based on a specified material thickness.

The control circuitry 204 receives an input selecting one or more of the modes 222-234 from the user interface 216 (e.g., from the input device 218). Additionally or alternatively, the control circuitry 204 may receive the input selecting one or more of the modes 222-234 via a wireless or wired interface to an external device. For example, the control circuitry 204 may be communicatively connected to a computer, a smartphone, tablet computer, and/or any other operator interface device (e.g., via communication circuitry 244), through which an operator can control the power system 200 (e.g., select any of the modes 222-234 for operation).

Example welding-type process modes 222, 224 include a gas metal arc welding process, a flux cored arc welding process, a shielded metal arc welding process, a tungsten inert gas welding process, an induction heating process, a cutting process, or a gouging process. In some other examples, the modes 222, 224 may include predetermined welding schedules corresponding to sets of welding parameters. Example battery charging modes 226, 228 may include bulk or constant current charging mode, absorption or constant voltage charging mode, float mode, and/or jump starting mode. Additionally or alternatively, the battery charging modes 226, 228 are divided by nominal voltage of the subject battery, such as 12 VDC nominal voltage or 24 VDC nominal voltage, and the control circuitry 204 manages the charging modes. In some examples, two or more battery charging modes may specify the current limit, such as a first current limit for battery charging and a second current limit for jump starting an engine.

While the example input device is a rotary encoder, other types of input devices may be used, such as a rotary switch, a pushbutton switch, a menu selection, a touchscreen, and/or any other input device. Additionally or alternatively, the indicators 236-242 may be replaced by a digital display, an LCD display, conventional indicator lights, and/or any other indicator device. While the indicators 236-242 correspond to example modes of operation (e.g., a battery charging indicator 236, a jump starting indicator 238, a welding indicator 240, and a vehicle battery indicator 242), the indicators 236-242 may correspond to other modes of operation. For example, the user interface 216 may include an indicator for each weld process, battery charging mode, and/or other output that may be selected and/or output by the power system 200.

The control circuitry 204 determines the selected mode of operation of the switched-mode power supply 202 based on the signal from the input device 218, and controls the indicators 236-242 based on the selected mode of operation. For example, when one of the welding processes 222, 224 is selected, the control circuitry 204 controls a "welding" indicator 240 to be illuminated. The control circuitry 204 further controls the switched-mode power supply 202 to output power based on the selected mode of operation. The example control circuitry 204 may also control a speed of the engine 32 based on the selected mode of operation and the current load on the switched-mode power supply 202.

Figure 3:
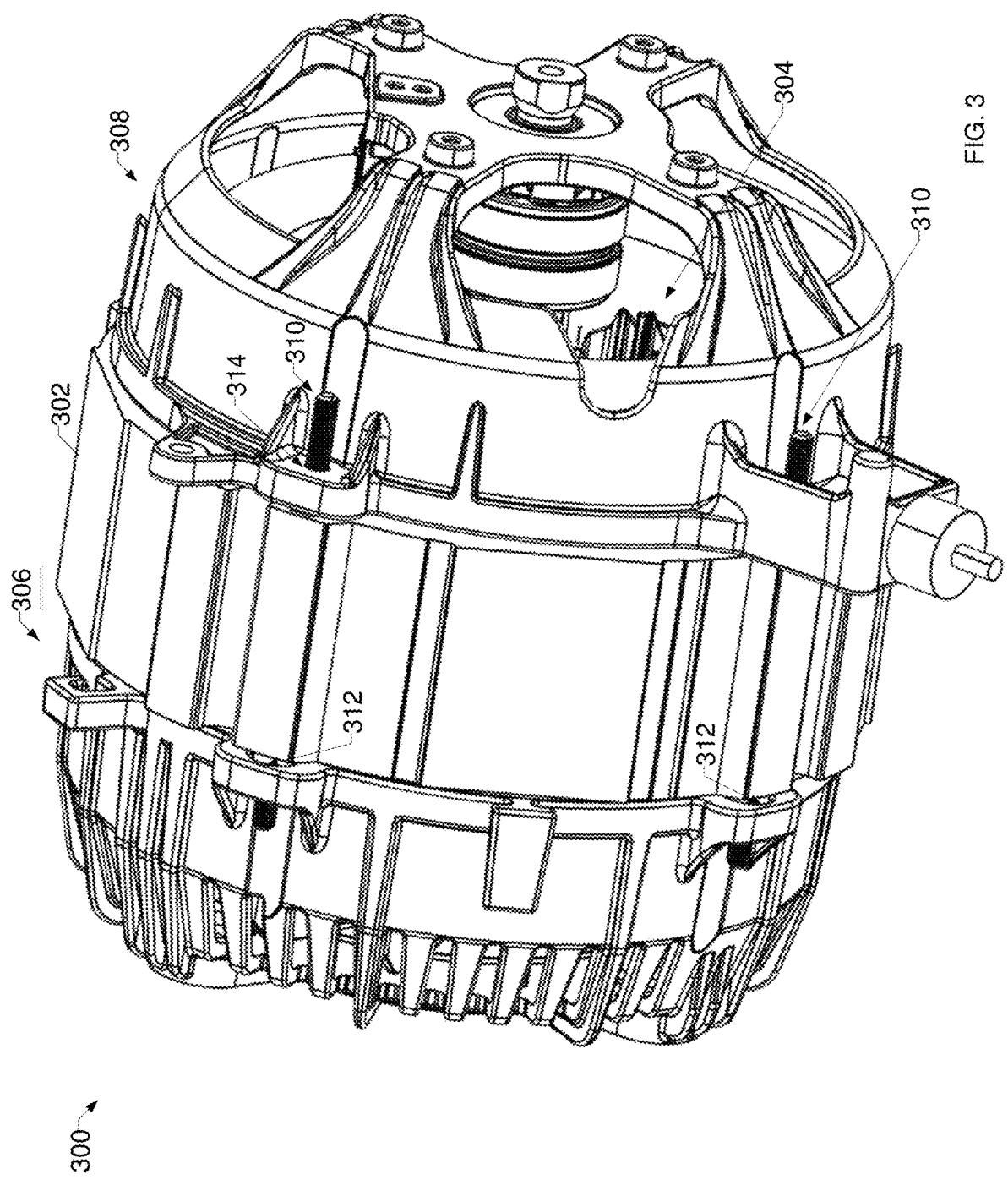
FIG. 3 is a perspective view of an example engine-driven generator that may implement the generator of FIG. 2, including generator housings and alignment, mounting, and locating hardware.

FIG. 3 is a perspective view of an example engine-driven generator 300 that may implement the generator 34 of FIG. 2. The example generator 300 is a DC brush-type generator having a stator assembly 302 and a rotor assembly 304. The rotor assembly 304 is coupled to the output of an engine (e.g., the engine 32 of FIG. 2).

The generator 300 includes a first housing 306 and a second housing 308 to support the weight of the stator assembly 302 and the rotor assembly 304, and to keep the stator assembly 302 and the rotor assembly 304 in alignment (e.g., self-aligned and/or in alignment with an engine shaft). The stator assembly 302 is connected between the first and second housings 306, 308. The first housing 306 mechanically couples, or adapts, the stator assembly 302 to the engine.

The second housing 308 mechanically couples the stator assembly 302 to an enclosure or other support structure (e.g., to an enclosure and/or internal support structure of the power system 200). For example, the second housing 308 may include feet, shock absorbing structures, and/or any other fastening structures to couple and/or provide support from the enclosure to the second housing 308. In some other examples, the generator 300 may be cantilevered from the engine via the first housing 306 and suitable mechanical connections to the engine (e.g., bolting or attachment hardware, a cantilevered shelf, etc.).

To reduce the complexity of manufacturing and assembly of the generator 300, the example generator 300 is assembled using hardware assemblies 310 that align and locate the stator assembly 302 with the first and second housings 306, 308. In the example of FIG. 3, the hardware assemblies 310 are located at multiple points around the circumference of the stator assembly 302, some of which are obscured in the view of FIG. 3.

Figure 4:
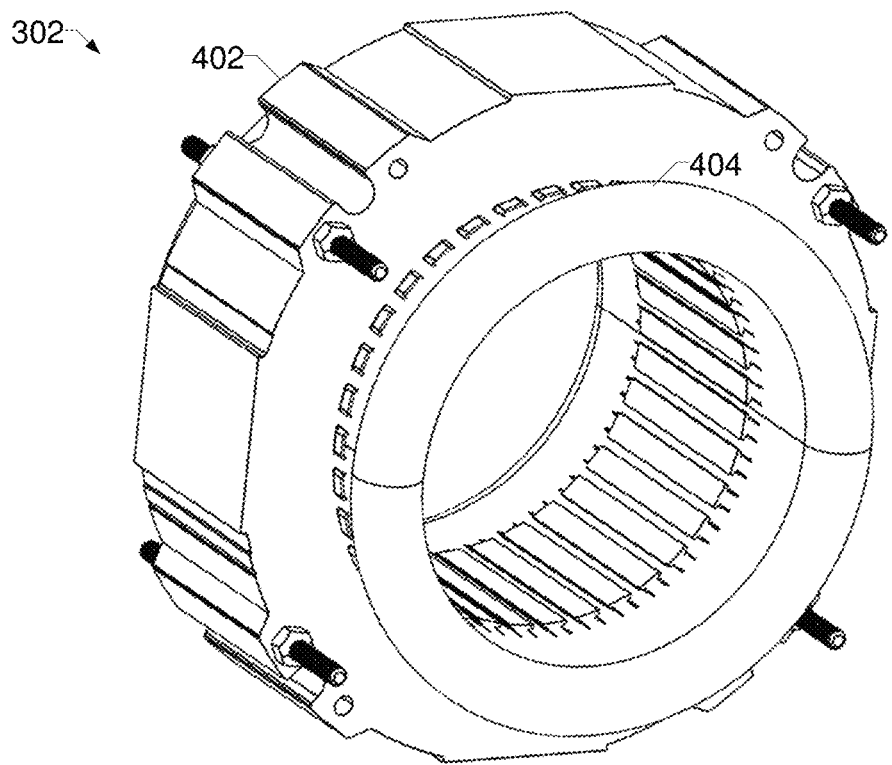
FIG. 4 is a perspective view of the example stator assembly of FIG. 3 illustrating a portion of the alignment hardware.
Figure 5:
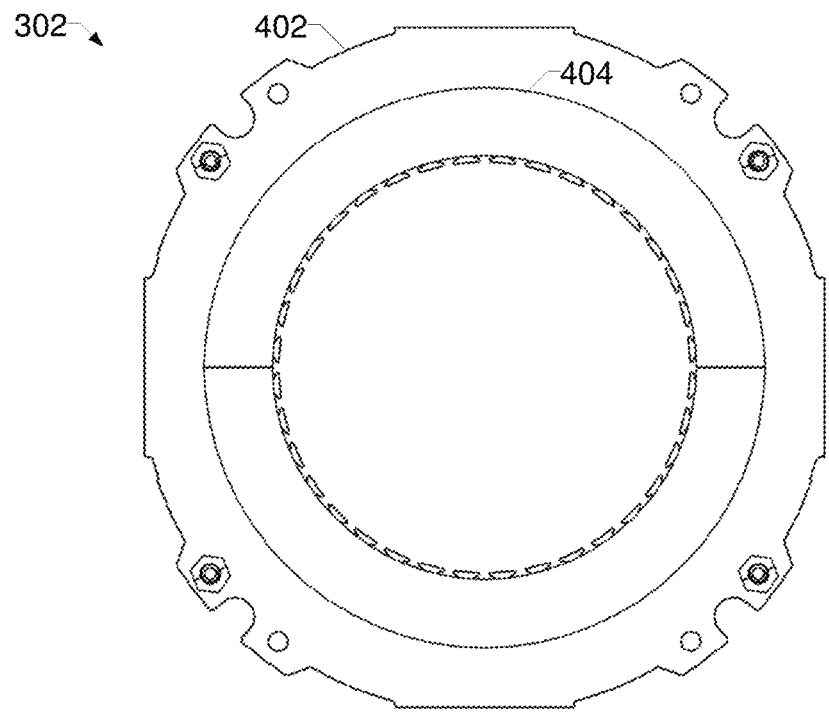
FIG. 5 is an elevation view of the example stator assembly of FIGS. 3 and 4.

The example stator assembly 302 is constructed using a stack of laminations 402, which are clamped together by the hardware assemblies 310 at multiple points around the circumferences of the stator laminations, as illustrated in FIGS. 4 and 5. FIG. 4 is a perspective view of the example stator assembly 302 of FIG. 3 illustrating a portion of the alignment hardware. FIG. 5 is an elevation view of the example stator assembly 302 of FIGS. 3 and 4. The laminations provide a magnetic core and structural support for stator windings 404. Each of the example hardware assemblies 310 includes stator securing hardware, which secures the laminations of the stator assembly 302.

Each hardware assembly 310 further includes first and second locating hardware to easily locate the hardware assembly 310 to the respective one of the housings 306, 308 during attachment of the stator assembly 302 to the housings 306, 308. As discussed in further detail below, the housings 306, 308 include corresponding mounting holes 312, 314, which are machined or otherwise constructed with mating faces that mate with the respective locating hardware. The example hardware assemblies 310 further include securing hardware to secure the housings 306, 308 to the stator assembly 302 after proper location of the stator assembly 302 with respect to the housings 306, 308.

Figure 6:
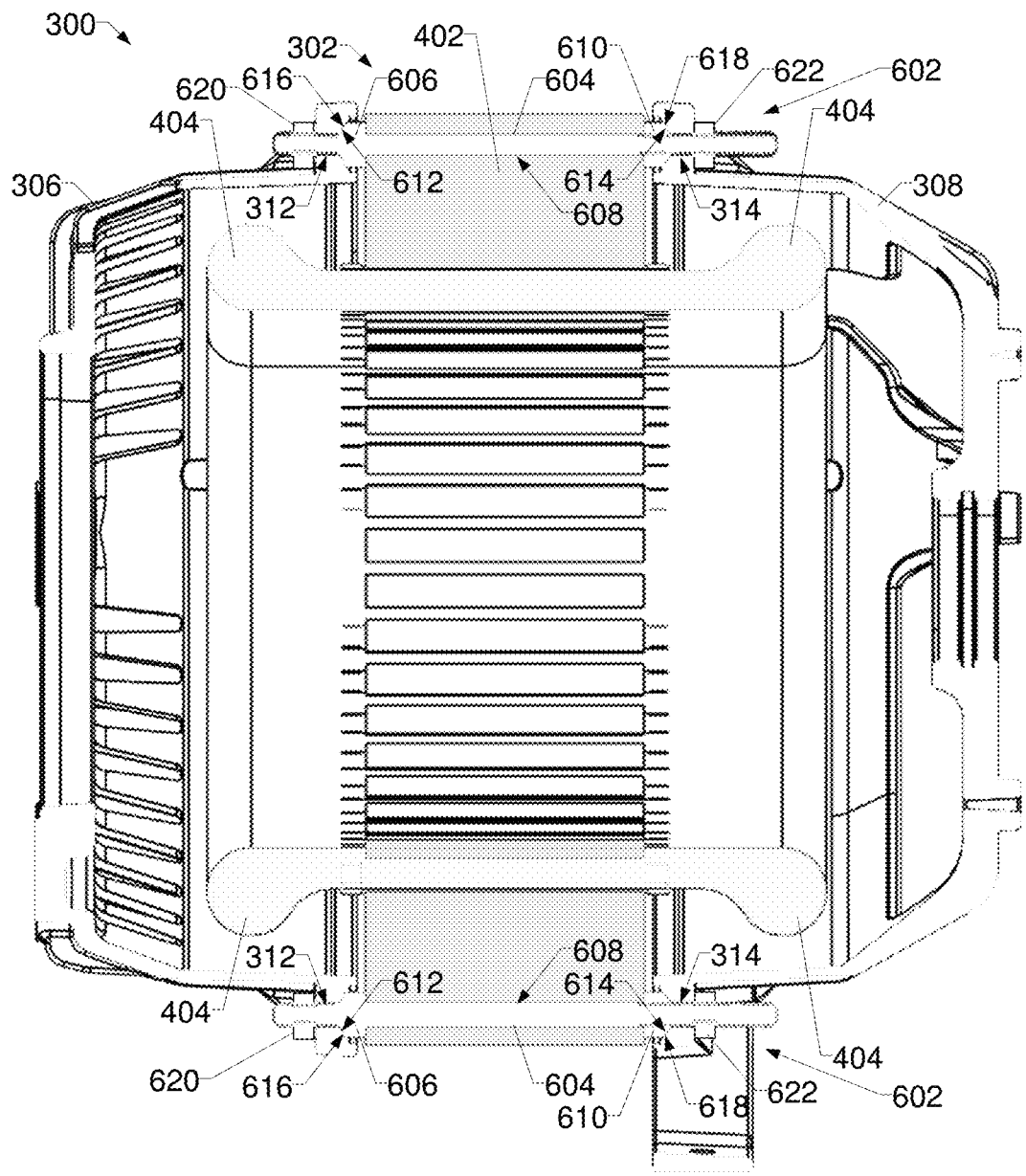
FIG. 6 is a cross-sectional elevation view of the example generator of FIG. 3.
Figure 8:
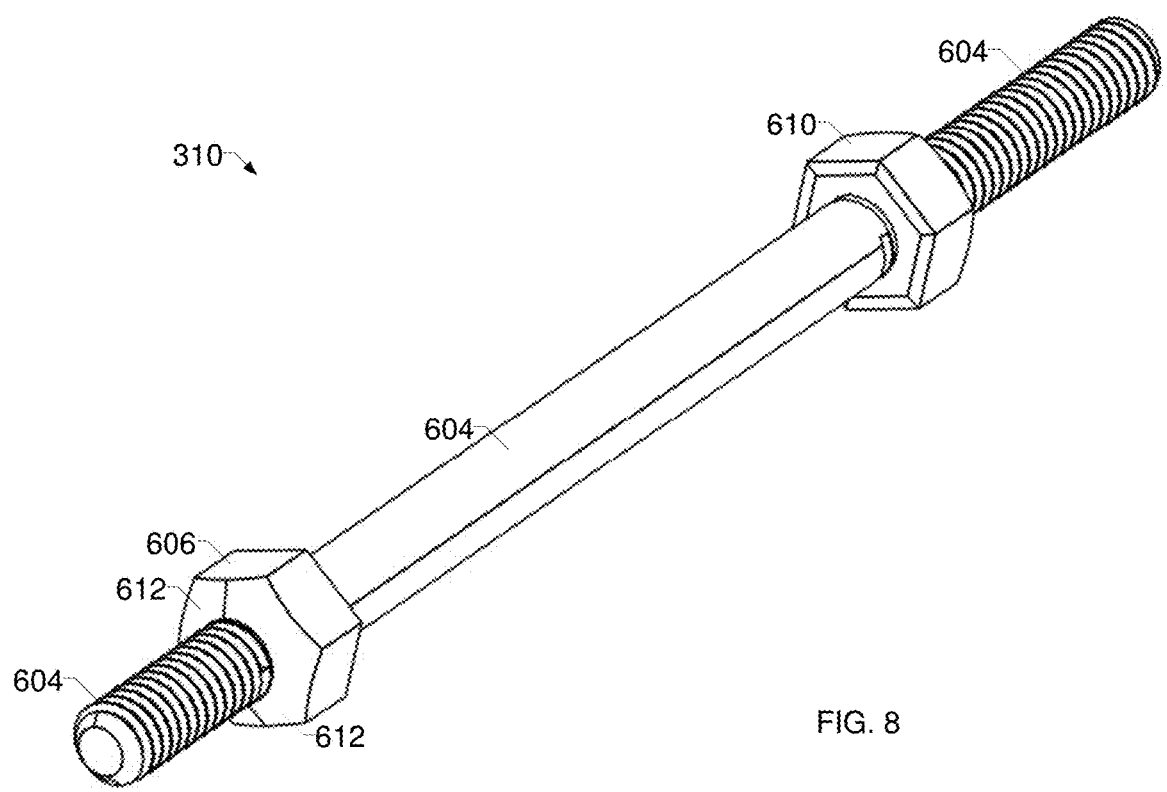
FIG. 8 is a perspective view of the example alignment, locating, and securing hardware of FIGS. 6 and 7A.
Figure 9:
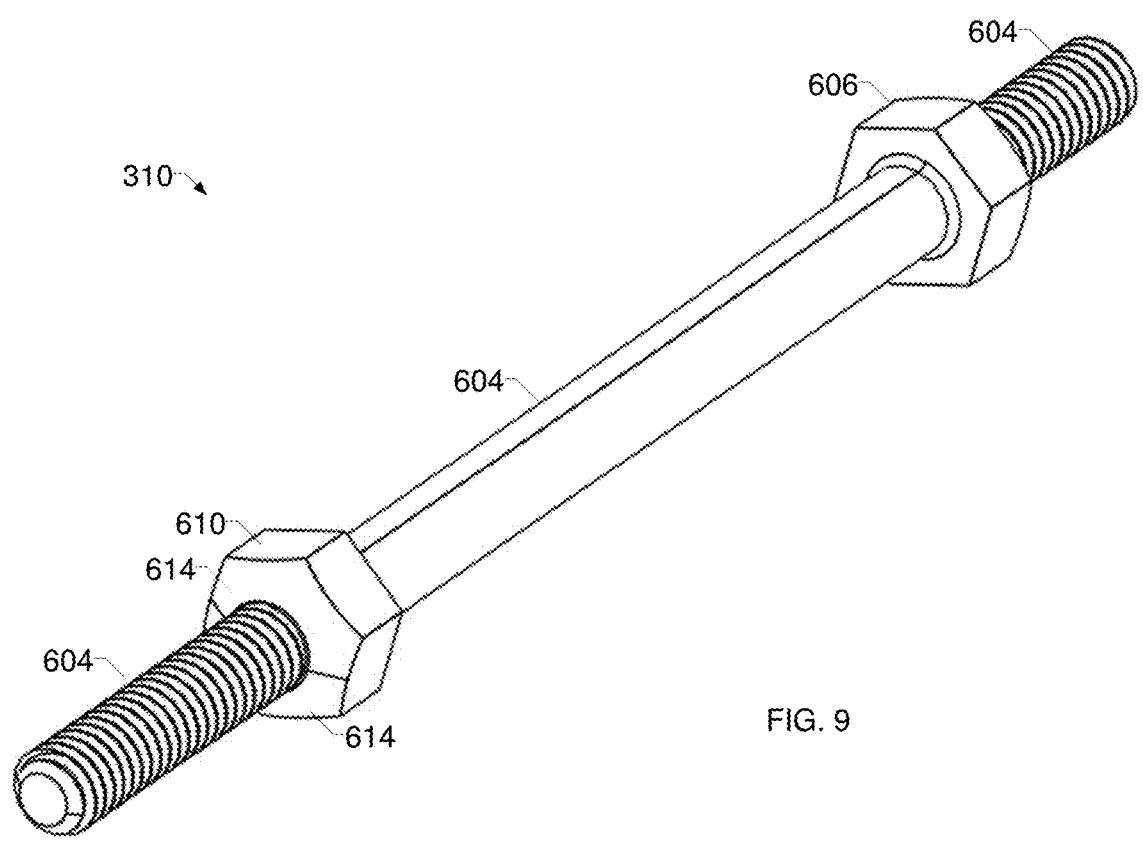
FIG. 9 is another perspective view of the example alignment, locating, and securing hardware of FIGS. 6 and 7A.

FIG. 6 is a cross-sectional elevation view of the example generator 300 of FIG. 3. FIG. 7A is a more detailed cross-sectional elevation view of an example of an assembly of the generator housings 306, 308, the stator assembly 302, and one of the example hardware assemblies 310 including alignment, locating, and securing hardware. FIG. 7B is a detailed cross-sectional elevation view of an example of the assembly of the generator housings 306, 308, the stator assembly 302, and another example implementation of the hardware assemblies 310 including alignment, locating, and securing hardware.

As illustrated in FIGS. 6, 7A, and 7B, the hardware assemblies 310 include alignment hardware 602 which, in the illustrated example, is a stud 604 having a head 606. The stud 604 extends in both directions from the head 606, and has threads at both ends. The stud 604 aligns respective mounting holes 608 in the stator laminations 402 to thereby align the stator assembly 302. By using the head 606 integral to the stud 604, the distance of the head 606 to the end of the stud 604 (e.g., the length of the threaded section) can be controlled relative to the stack of stator laminations 402. While the head 606 is integral with the stud 604 in the illustrated example, in other examples the head 606 may be a separate nut threaded onto the stud 604.

The hardware assemblies 310 also include stator securing hardware 610, which secures the stator assembly 302 (e.g., secures the stack of laminations) in cooperation with the alignment hardware 602. In the example of FIG. 6, the stator securing hardware 610 includes a nut threaded onto the stud 604 on an opposite side of the first mounting holes 608 from the head 606. In the example of FIG. 6, the stud 604 has threads on both ends, such that the stud 604 and nut 610 function as a bolt to clamp the stator laminations 402, while also leaving threads extending beyond the head 606 and the nut 610. The threaded sections can then be used for mounting the stator assembly 302 to the housings 306, 308. The locations of the stud 604 and nut 610 are precisely controlled in accordance with the precision of the stator lamination stampings.

The hardware assemblies 310 further include stator locating faces 612, 614 configured to locate and mate with complementary mating faces 616, 618 of the mounting holes of the housings 306, 308. The example stator locating faces 612, 614 and/or mating faces 616, 618 may be machined, cast, and/or otherwise formed to have complementary geometries. The example locating faces 612, 614 are conically shaped, tapered, and/or otherwise shaped to direct the hardware assemblies 310 and, as a result, the mounting holes 608 of the stator assembly 302 into improved alignment with the mounting holes 312, 314. The example mating faces 616, 618 have inverted geometries to the locating faces 612, 614.

In the example of FIGS. 6 and 7A, the head 606 and the stator securing nut 610 include the locating faces 612, 614 to serve as the alignment hardware 602, the stator securing hardware 610, and the stator locating faces 612, 614. In the example of FIG. 7B, the hardware assemblies 310 include one or two spacers 702, 704 which are separate from, but adjacent to, the head 606 and the nut 610, respectively. The spacers 702, 704 include the mating faces 612, 614 to assist in locating the stator assembly 302 relative to the first and/or second housings 306, 308 by mating with the complementary faces 616, 618 of the mounting holes 312, 314. The example spacers 702, 704 are not threaded, and are sufficiently rigid to support the stator assembly 302 in alignment with the housings 306, 308.

Using the locating faces 612, 614 and the mating faces 616, 618, the stator assembly 302 can easily be precisely positioned and secured in alignment with the engine center line, so that the stator-to-rotor gap is consistent within the generator 300. The complementary geometries of the locating faces 612, 614 and the mating faces 616, 618 on the housings 306, 308 can be quickly and reliably produced, thereby reducing manufacturing and assembly costs of the generator 300 and the system 200. The locating faces 612, 614 and the mating faces 616, 618 control the true position of the stator assembly 302 because, as the assembly is tightened, the conical or tapered faces 612-618 draw the stud 604 into alignment with the mounting holes 312, 314. As a result, the geometry in the housings 306, 308 produces accurate location and axial position of the head 606 and the nut 610 and, as a result, the stud 604. Inclusion of the locating faces 612, 614 and the mating faces 616, 618 on the multiple sets of hardware assemblies 310 around the stator assembly 302 provides uniform attachment and connection between the stator assembly 302 and the housings 306, 308.

The example hardware assemblies 310 further include housing securing hardware 620, 622, which secures the housings 306, 308 to the stator assembly 302. In the example of FIGS. 6, 7A, and 7B, the housing securing hardware 620, 622 include nuts that are threaded onto the ends of the stud 604 and tightened to secure the respective housings 306. While tightening the housing securing hardware 620, 622, compression between the locating faces 612, 614 and the mating faces 616, 618 force the housings 306, 308 into alignment with the stator assembly 302.

The stator assembly 302 may be varnished after assembly to improve insulation. The hardware assemblies 310 provide for precise and reproducible locating of the stator assembly 302 with respect to the rotor assembly 304. The precision locating allows for the stator assembly 302 to be varnished with thick varnish without the need for extensive secondary processing or the need to tightly control the varnish process. The hardware assemblies 310 are installed prior to stator varnishing. In some examples, rubber caps or other protection are placed over the hardware assemblies to cover the threads, locating faces, and mating faces. These caps are easily applied and removed to produce varnish free threads and conical faces for attachment of the varnished stator assembly 302 to the housings 306, 308.

While the examples of FIGS. 6-9 illustrate the locating faces 612, 614 on the head 606 and the stator securing nut 610, and the mating faces 616, 618 are on the insides of the mounting holes 312, 314 (e.g., facing the stator assembly 302), in other examples the locating faces 612, 614 may additionally or alternatively be provided on the housing securing hardware 620 and/or the housing securing hardware 622, with the locating faces 612 and/or the locating faces 614 being on the outsides of the mounting holes 312, 314 (e.g., facing away from the stator assembly 302).

Figure 10:
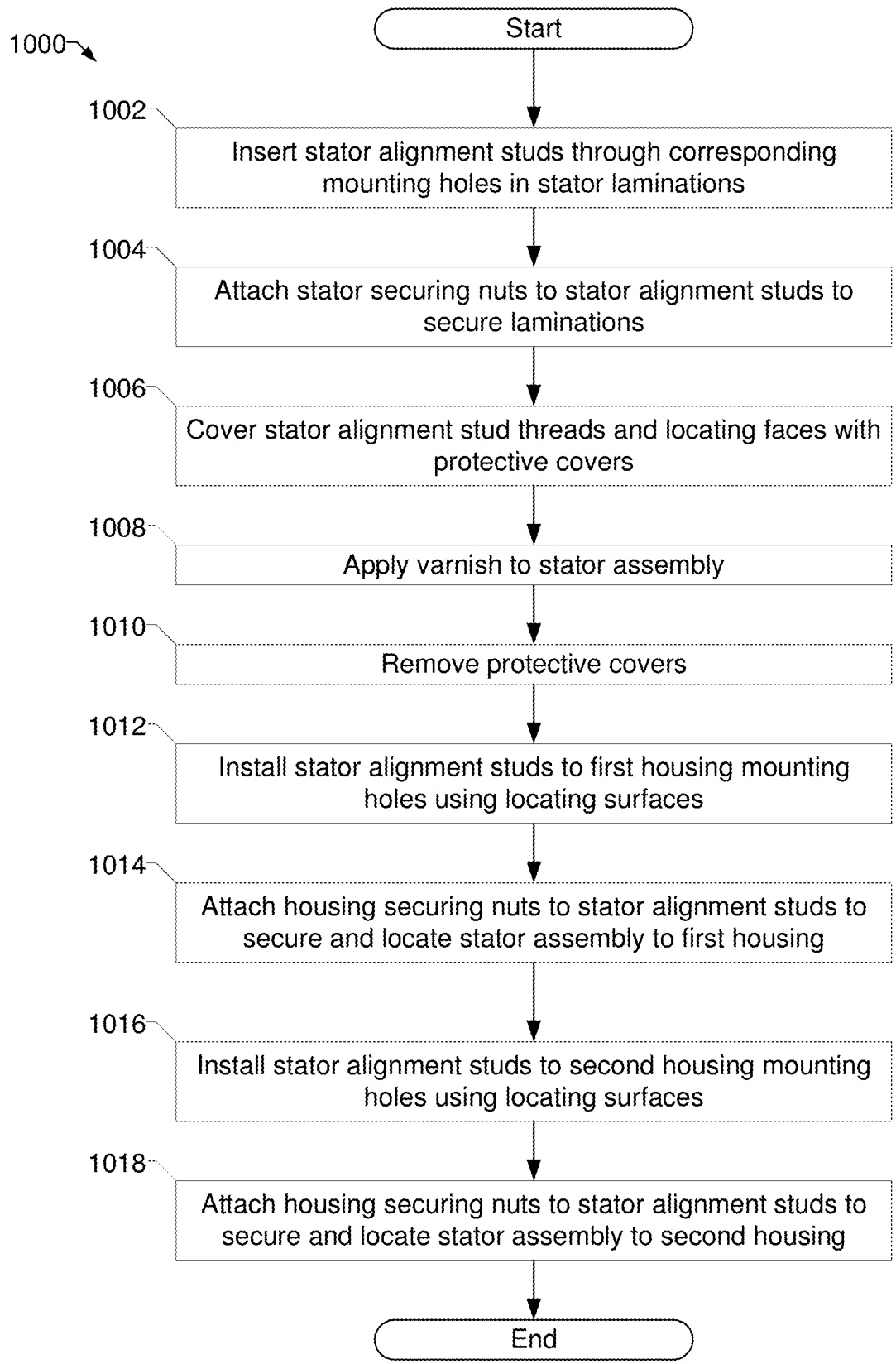
FIG. 10 is a flowchart representative of an example method that may be used to assemble the example engine-driven generator of FIG. 3.

FIG. 10 is a flowchart representative of an example method 1000 that may be used to assemble the example engine-driven generator 300 of FIG. 3. The example method 1000 improves the ease of assembly an engine-driven generator 300, and power systems in which such generators are installed, by eliminating multiple machining steps and/or reducing the complexity of assembly steps used to produce and/or assemble conventional generator housings.

At block 1002, an operator inserts the stator alignment studs 604 through corresponding mounting holes 608 in laminations 402 of the stator assembly 302. As shown in FIGS. 4 and 5, multiple stator alignment studs 604 may be inserted into corresponding mounting holes at multiple points around the lamination stack 402. In some examples, the laminations 402 have precise mounting holes 608 to consistently align the stator laminations 402

At block 1004, the operator attaches stator securing nuts 610 to the stator alignment studs 604, and tightens the nuts 610 and the heads 606 of the studs 604 to secure (e.g., clamp) the laminations 402.

At block 1006, the operator covers the threads of the stator alignment stud 604 and the locating faces 612, 614 with a protective cover (e.g., rubber covers to protect against application of varnish to the locating faces 612, 614 and/or threads). At block 1008, the operator applies varnish to the stator assembly 302. At block 1010, the operator removes the protective covers.

At block 1012, the operator installs the stator alignment studs 604 to the mounting holes 312 of the first housing 306 using the locating faces 612. For example, the operator may manipulate the stator assembly 302 to position multiple studs 604 into corresponding mounting holes 312.

At block 1014, the operator attaches first housing securing nuts 620 onto the studs 604 to secure and locate the stator assembly 302 to the first housing 306. As the operator tightens the securing nuts 620, the locating faces 612 and the corresponding mating faces 616 of the first housing 306 are drawn into closer alignment.

At block 1016, the operator installs the stator alignment studs 604 to the mounting holes 314 of the second housing 308 (or the mounting holes 314 to the studs 604) using the locating faces 614. For example, the operator may manipulate the stator assembly 302 and/or the second housing 308 to position multiple studs 604 into corresponding mounting holes 314.

At block 1018, the operator attaches second housing securing nuts 622 onto the studs 604 to secure and locate the stator assembly 302 to the second housing 308. As the operator tightens the securing nuts 622, the locating faces 614 and the corresponding mating faces 618 of the second housing 308 are drawn into closer alignment. The example method 1000 may then end.

In some examples, the first housing 306 may be attached to the engine 32 prior to attachment of the stator assembly 302 to the first housing 306. In other examples, the first housing 306 and the stator assembly 302 are attached to the engine 32 after securing the first housing 306 and the stator assembly 302.

While disclosed examples include both the first housing 306 and the second housing 308, in other examples the stator assembly 302 may be attached to only the first housing 306 or only the second housing 308 using the disclosed methods and apparatus. For example, locating the stator assembly 302 and only the first housing 306 or only the second housing 308 may involve only the applicable alignment hardware, securing hardware, and locating faces.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven generator, comprising:
   a stator having first mounting holes;
   a first generator housing configured to couple the stator to an engine, and having second mounting holes;
   first stator alignment hardware configured to align the first mounting holes of the stator with corresponding ones of the second mounting holes of the first generator housing;
   stator securing hardware configured to secure the stator in cooperation with the first stator alignment hardware;
   first locating faces configured to mate with mating faces of corresponding ones of the second mounting holes to locate the first mounting holes with the second mounting holes, the first locating faces being positioned between the first mounting holes and the mating faces of the second mounting holes; and
   first housing securing hardware configured to secure the first generator housing to the stator.

2. The engine-driven generator as defined in claim 1, further comprising:
   a second generator housing opposite the first generator housing and having third mounting holes;
   second locating faces configured to mate with mating faces of corresponding ones of the third mounting holes to locate the first mounting holes with the third mounting holes; and
   second housing securing hardware configured to secure the second generator housing to the stator.

3. The engine-driven generator as defined in claim 2, wherein the second locating faces are faces on the stator securing hardware and are configured to align the first stator alignment hardware with the corresponding ones of the third mounting holes.

4. The engine-driven generator as defined in claim 2, wherein the second housing securing hardware comprises a plurality of third nuts configured to secure the second generator housing to the stator via the first stator alignment hardware.

5. The engine-driven generator as defined in claim 2, wherein the second generator housing comprises a bearing configured to support a rotor assembly.

6. The engine-driven generator as defined in claim 1, wherein the first locating faces are located on the first stator alignment hardware and are configured to align the first stator alignment hardware with the corresponding ones of the second mounting holes.

7. The engine-driven generator as defined in claim 6, wherein the first stator alignment hardware comprises a plurality of studs, each of the studs having a head having a corresponding one of the first locating faces.

8. The engine-driven generator as defined in claim 7, wherein the stator securing hardware comprises a plurality of first nuts configured to secure the stator in cooperation with the plurality of studs.

9. The engine-driven generator as defined in claim 8, wherein the first housing securing hardware comprises a plurality of second nuts configured to secure the first generator housing to the stator via the plurality of studs.

10. The engine-driven generator as defined in claim 7, wherein the first locating faces of the plurality of studs comprise tapered faces, and the mating faces of the second mounting holes are configured to guide the first locating faces of the plurality of studs into alignment with the second mounting holes.

11. The engine-driven generator as defined in claim 1, wherein the first stator alignment hardware comprises a bolt and a separate nut having the mating face.

12. The engine-driven generator as defined in claim 1, further comprising an enclosure and the engine within the enclosure, and a rotor assembly is driven by the engine and the engine-driven generator is within the enclosure.

13. The engine-driven generator as defined in claim 12, wherein the enclosure comprises a support structure, and the second generator housing comprises mounting feet configured to secure the second generator housing to the support structure.

14. The engine-driven generator as defined in claim 1, wherein the stator comprises a stack of laminations, and the first stator alignment hardware and the stator securing hardware clamp the stack of laminations together.

15. The engine-driven generator as defined in claim 1, wherein the first locating faces and the mating faces of the second mounting holes are configured to bring the corresponding ones of the first mounting holes and the second mounting holes into axial alignment as the first housing securing hardware is tightened to secure the first generator housing to the stator.

16. A method to assemble an engine-driven generator, the method comprising:
  installing a plurality of studs through corresponding first mounting holes in a stator assembly, and securing the stator assembly by securing a first plurality of nuts onto the plurality of studs;
  aligning first ends of the plurality of studs with second mounting holes in a first generator housing by aligning tapered faces of the plurality of studs with corresponding tapered faces of the second mounting holes; and
  securing the stator assembly to the first generator housing by securing a second plurality of nuts to the studs on opposite ends of the second mounting holes from the tapered faces of the plurality of studs.

17. The method as defined in claim 16, further comprising:
  aligning second ends of the plurality of studs with third mounting holes in a second generator housing by aligning tapered faces of the first plurality of nuts with corresponding tapered faces of the third mounting holes; and
  securing the second generator housing to the stator assembly by securing a third plurality of nuts to the studs on opposite ends of the third mounting holes from the tapered faces of the first plurality of nuts.

18. An engine-driven generator, comprising:
  a rotor assembly;
  a stator assembly having first mounting holes;
  a first generator housing configured to couple the rotor assembly and the stator assembly to an engine, and having second mounting holes;
  a second generator housing opposite the first generator housing and having third mounting holes;
  a plurality of studs configured to align the first mounting holes of the stator assembly with corresponding ones of the second mounting holes of the first generator housing and corresponding ones of the third mounting holes of the second generator housing, each of the studs comprising a head having a tapered face configured to mate with a tapered face of a corresponding one of the second mounting holes;
  a plurality of first nuts configured to secure the stator assembly in cooperation with the plurality of studs, each of the first nuts comprising a tapered face configured to mate with a tapered face with a corresponding one of the third mounting holes;
  a plurality of second nuts configured to secure the first generator housing to the stator assembly via the plurality of studs; and
  a plurality of third nuts configured to secure the second generator housing to the stator assembly via the plurality of studs.

* * * * *